(12) United States Patent
Mochizuki

(10) Patent No.: US 9,835,718 B2
(45) Date of Patent: Dec. 5, 2017

(54) RANGE FINDER AND OPTICAL DEVICE

(71) Applicant: NIKON VISION CO., LTD., Tokyo (JP)

(72) Inventor: Masahiro Mochizuki, Yokohama (JP)

(73) Assignee: NIKON VISION CO., LTD., Tokyo (JP)

( * ) Notice: Subject to any disclaimer, the term of this patent is extended or adjusted under 35 U.S.C. 154(b) by 0 days.

(21) Appl. No.: 15/443,083

(22) Filed: Feb. 27, 2017

(65) Prior Publication Data

US 2017/0234974 A1 Aug. 17, 2017

Related U.S. Application Data

(63) Continuation of application No. PCT/JP2014/004412, filed on Aug. 27, 2014.

(51) Int. Cl.
*G01S 7/486* (2006.01)
*G01S 7/481* (2006.01)
*G01S 17/10* (2006.01)

(52) U.S. Cl.
CPC ........... *G01S 7/4865* (2013.01); *G01S 7/4811* (2013.01); *G01S 17/10* (2013.01)

(58) Field of Classification Search
CPC ..................................................... G01S 7/4865
See application file for complete search history.

(56) References Cited

U.S. PATENT DOCUMENTS

| 4,494,687 A * | 1/1985 | Rossi | ................... | B23K 37/047 |
| | | | | 104/48 |
| 6,862,084 B2 | 3/2005 | Nagata et al. | | |
| 2015/0362588 A1 * | 12/2015 | Ohmuro | ................... | G01S 7/497 |
| | | | | 356/5.04 |
| 2016/0363668 A1 * | 12/2016 | Xu | ................... | G01S 17/107 |
| 2017/0045358 A1 * | 2/2017 | Masuda | ................... | G01C 3/06 |

FOREIGN PATENT DOCUMENTS

| JP | 2000-187151 A | 7/2000 |
| JP | 2004-101342 A | 4/2004 |
| JP | 2009-270856 A | 11/2009 |

OTHER PUBLICATIONS

Nov. 25, 2014 International Search Report issued in International Patent Application No. PCT/JP2014/004412.
Feb. 28, 2017 International Preliminary Report on Patentability issued in International Patent Application No. PCT/JP2014/004412.

* cited by examiner

*Primary Examiner* — W B Perkey
(74) *Attorney, Agent, or Firm* — Oliff PLC

(57) ABSTRACT

A distance detection apparatus including: a light output unit which outputs a light; a computation unit which computes a distance to a detection target by using a time until when the light output from the light output unit is received in a light receiving unit; a deblurring optical system which is driven based on a detection result of a blurring and through which the output light is transmitted; a detection unit which detects a position of the deblurring optical system; a storage unit which stores a predetermined range; a determination unit which determines whether the position detected by the detection unit is included in the predetermined range; and a control unit which controls a light output by the light output unit in accordance with a determination result of the determination unit.

16 Claims, 10 Drawing Sheets

RANGE FINDER AND OPTICAL DEVICE

BACKGROUND

1. Technical Field

The present invention relates to a distance detection apparatus and an optical device.

2. Related Art

Conventionally, a range finder has been known which irradiates a pulse laser and calculates a distance to an object based on a transmission time of the laser. Some range finders include a function of correcting a blurring due to hand movements.

[Patent Document 1] Japanese Patent Application Publication No. 2004-101342

In a function of correcting a blurring due to hand movements, there is a disadvantage that a sighting target and a ranging target become different if a sighting optical system is corrected without correcting an optical system of a transmitting and receiving unit. On the other hand, correcting an optical system of a transmitting and receiving unit in addition to a sighting optical system results in a problem of an enlarged apparatus.

SUMMARY

Therefore, in one aspect of the technical breakthrough (innovation) included herein, the purpose is to provide a distance detection apparatus and an optical device to solve the problem described above. This purpose is achieved by a combination of the claimed features. That is, in a first aspect of the present invention, provided is a distance detection apparatus including: a light output unit which outputs a light; a computation unit which computes a distance to a detection target by using a time until when the light output from the light output unit is received in a light receiving unit; a deblurring optical system which is driven based on a detection result of a blurring and through which the output light is transmitted; a detection unit which detects a position of the deblurring optical system; a storage unit which stores a predetermined range; a determination unit which determines whether the position detected by the detection unit is included in the predetermined range; and a control unit which controls a light output by the light output unit in accordance with a determination result of the determination unit.

In a second aspect of the present invention, provided is a distance detection apparatus including: a light output unit which outputs a light; a computation unit which computes a distance to a detection target by using a time until when the light output from the light output unit is received in a light receiving unit; a deblurring optical system which is driven based on a detection result of a blurring and through which the output light is transmitted; a detection unit which detects a drive amount of the deblurring optical system; a storage unit which stores a predetermined range; a determination unit which determines whether the drive amount detected by the detection unit is included in the predetermined range; and a control unit which controls a light output by the light output unit in accordance with a determination result of the determination unit.

In a third aspect of the present invention, provided is a distance detection apparatus including: a computation unit which computes a distance to a detection target by using a time until when an output light is received in a light receiving unit; a deblurring optical system which is driven based on a detection result of a blurring and through which the output light is transmitted; a detection unit which detects at least one of a drive amount of the deblurring optical system and a position of the deblurring optical system; a storage unit which stores a predetermined range; and a determination unit which determines whether at least one of the drive amount and the position detected by the detection unit is included in the predetermined range; wherein the distance detection apparatus controls the computation unit in accordance with a determination result of the determination unit.

In a fourth aspect of the present invention, provided is a distance detection apparatus including: a light receiving unit which receives an output light; a computation unit which computes a distance to a detection target by using a time until when the output light is received in the light receiving unit; a deblurring optical system which is driven based on a detection result of a blurring and through which the output light is transmitted; a detection unit which detects at least one of a drive amount of the deblurring optical system and a position of the deblurring optical system; a storage unit which stores a predetermined range; and a determination unit which determines whether at least one of the drive amount and the position detected by the detection unit is included in the predetermined range; wherein the distance detection apparatus controls the light receiving unit in accordance with a determination result of the determination unit.

In a fifth aspect of the present invention, provided is an optical device including any of the distance detection apparatuses described above.

The summary clause does not necessarily describe all necessary features of the embodiments of the present invention. The present invention may also be a sub-combination of the features described above.

DESCRIPTION OF EXEMPLARY EMBODIMENTS

The embodiments do not limit the invention according to the claims, and all the combinations of the features described in the embodiments are not necessarily essential to means provided by aspects of the invention.

Figure 1:
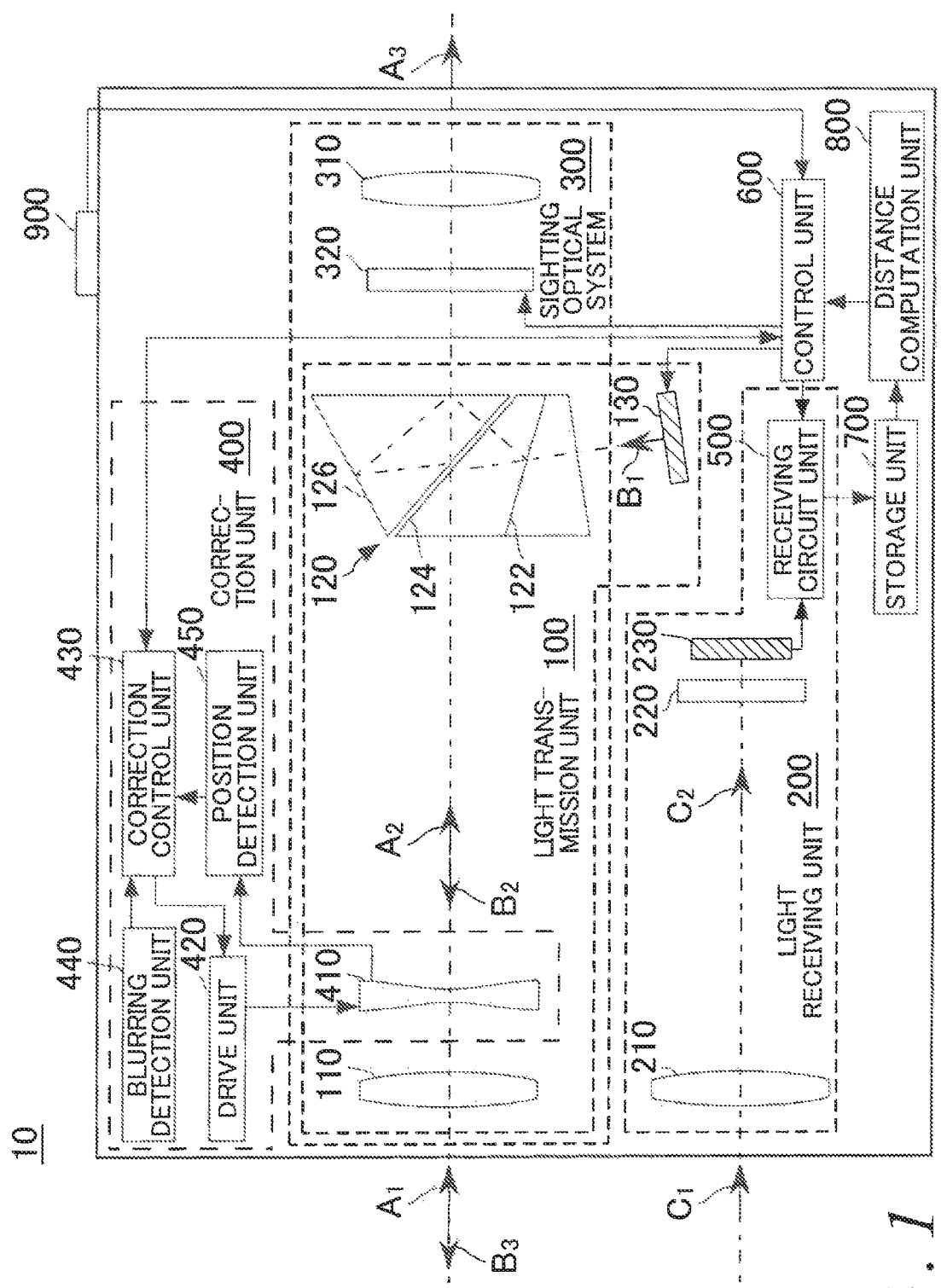
FIG. 1 is a block diagram of a range finder 10 in a first embodiment.

FIG. 1 is a block diagram of a range finder 10 in a first embodiment. The range finder 10 includes a light transmission unit 100, a light receiving unit 200, a sighting optical system 300, a correction unit 400, a control unit 600, a storage unit 700, a distance computation unit 800 and a ranging button 900.

The light transmission unit 100 outputs a measurement light to a sighting target. The light transmission unit 100 includes an object lens 110, a correction lens 410, an erect prism 120 and a light emitting unit 130. In the following description, a direction in which the light transmission unit 100 of the range finder 10 outputs the measurement light, that is, an arrow direction of a light beam $B_3$ in the figure is referred to as a forward direction.

The light emitting unit 130 outputs pulse-like measurement lights of the predetermined number per unit time. Note that in the following description, a pulse-like measurement light may be referred to as a pulse tight in this case, the light emitting unit 130 outputs, for example, hundreds to thousands pulse lights per second as measurement lights. One example of the light emitting unit 130 is a semiconductor laser oscillating an infrared light. Hereinafter, the description is given using an exemplary case in which the light emitting unit 130 outputs a measurement light in the infrared region.

The erect prism 120 includes a dichroic reflection surface 122 reflecting a light of a visible light band and allowing a light of an infrared band to be transmitted, and total reflection surfaces 124, 126 having a high reflection ratio against the visible light band in addition to the infrared band. In the erect prism 120, the measurement light is transmitted through the dichroic reflection surface 122, reflected on the total reflection surface 124, and propagated forward within the range finder 10, as a light beam $B_2$. Further, the erect prism 120 inverts an inverted reflection image formed by an incident light beam to an erect image, by using the dichroic reflection surface 122, the total reflection surfaces 124, 126 and other reflection surfaces. Examples of the erect prism 120 are Dach prisms, Porro prisms and the like.

The object lens 110 is arranged at a front end of the range finder 10 and opposite to a ranging target at a front end surface thereof. The object lens 110 has a back end surface opposite to a front end surface of the erect prism 120, with the correction lens 410 positioned therebetween.

The light receiving unit 200 receives a back reflected light from the sighting target and outputs a light receiving signal which is a converted electrical signal. The light receiving unit 200 includes a light receiving lens 210, a band transmission filter 220 and a light receiving element 230 which are separate optical systems from the light transmission unit 100 and the sighting optical system 300. This allows the light receiving unit 200 to has a different optical axis from those of the light transmission unit 100 and the sighting optical system 300.

Behind the light receiving lens 210, the band transmission filter 220 and the light receiving element 230 are arranged in sequence. The band transmission filter 220 allows a light of a narrow wave length band including the measurement light to be transmitted and blocks or attenuates a light of other wave length bands. Examples of the light receiving element 230 are photodiodes, phototransistors and the like which are sensitive to a wave length band of the measurement light. In terms of removing an influence of a background light on the measurement light, it is preferable that the light receiving element 230 has a smaller light receiving area.

In the light receiving unit 200 described above, a light beam $C_1$, which is reflected or scattered on a target positioned anterior to the range finder 10, enters the light receiving lens 210. The light beam $C_1$ is collected in the light receiving lens 210 and propagated backward as a light beam $C_2$, and received in the light receiving element 230 after passing through the band transmission filter 220.

The light receiving element 230 converts the received light signal to an electrical signal which corresponds to the intensity and outputs the electrical signal. The electrical signal output from the light receiving element 230 is output to the receiving circuit unit 500.

The receiving circuit unit 500 includes an amplifier, a binarization circuit, a sampling circuit, a counter circuit, an oscillator and the like. The electrical signal from the light receiving element 230 is amplified in the amplifier, converted to a binarization signal in accordance with a predetermined threshold in the binarization circuit, and output to the sampling circuit. In the sampling circuit, a sampling clock of a specific frequency is input from the oscillator. Also, in the sampling circuit, a count value is input from the counter circuit. The sampling circuit performs digital sampling of the input binarization signal, generates a light receiving signal synchronized to the sampling clock, and stores the light receiving signal in the storage unit 700. Note that the count value is reset by the control unit 600 at the timing of output of the pulse light from the light emitting unit 130.

The sighting optical system 300 sights the target and forms an optical image of the sighting target. The sighting optical system 300 includes a reticle plate 320 and an eye lens 310. The sighting optical system 300 further shares the object lens 110, the correction lens 410 and the erect prism 120 with the light transmission unit 100. This allows the light transmission unit 100 and the sighting optical system 300 to have the same optical axis apparently. A user observes the front side through the sighting optical system 300 and sights the target.

The reticle plate 320 is located at a focal position of the object lens 110 of the light transmission unit 100. A front end of the eye lens 310 is opposite to a back end of the reticle plate 320 inside the range finder 10. The reticle plate 320 includes a sight indicator and a display unit. Exemplary shapes of the sight indicator are cross lines, rectangular frames, circular frames and the like. The display unit indicates a measurement result of a distance to the target to a user by characters, images and the like, using a transmissive liquid crystal and the like.

Among light reflected or scattered on the target positioned anterior to the range finder 10, a light beam $A_1$ propagated within a range of a visual angle of the object lens 110 enters the sighting optical system 300. The light beam $A_1$ is collected in the object lens 110, as a light beam $A_2$, and output through the erect prism 120, the reticle plate 320 and the eye lens 310, as a light beam $A_3$ to the back side of the range finder 10. This allows a user to observe the erect image of the target through the eye lens 310.

On an image of the target which a user observes through the eye lens 310, the sight indicator arranged on the reticle plate 320 is superimposed. Thus, a user orients the range finder 10 to sight the target such that the sight indicator is superimposed on the image to be observed through the eye lens 310. In this case, as the light transmission unit 100 and the sighting optical system 300 have the same optical axis apparently as described above, the measurement light is irradiated to the position indicated by the sight indicator.

The correction unit 400 drives the correction lens 410 by a drive amount in accordance with a blurring of the optical axis of the sighting optical system 300. The correction unit 400 includes the correction lens 410, a drive unit 420, a correction control unit 430, a blurring detection unit 440, and a position detection unit 450.

The blurring detection unit 440 includes a plurality of angular velocity sensors and the like of which detection directions intersect with one another. A plurality of angular velocity sensors are arranged in a direction, for example, to detect pitching and yawing of the range finder 10. When the range finder 10 is displaced, each angular velocity sensor outputs to the correction control unit 430 a signal corresponding to the displacement amount including a direction and a magnitude as information.

In the present embodiment, the correction control unit 430 functions as a drive amount computation unit to compute the drive amount of the correction lens 410 based on a movement amount applied to the sighting optical system 300. The correction control unit 430 computes the drive amount of the correction lens 410 in reference to the output of the blurring detection unit 440 periodically. The drive amount is a displacement amount of the correction lens 410 to negate an image blurring which occurs in the sighting optical system 300 due to the displacement of the range finder 10. The drive amount includes information of the direction and the magnitude. The correction control unit 430 outputs to the drive unit 420 and the control unit 600 a drive signal which drives the correction lens 410 by the drive amount.

The drive unit 420 displaces the correction lens 410 in a direction intersecting with the optical axis, based on the drive signal received from the correction control unit 430. The drive unit 420 may employ, for example, voice coil motor, piezoelectric motor and the like.

The position detection unit 450 detects the position of the correction lens 410 periodically and outputs to the correction control unit 430 a position signal which is a signal corresponding to the position. The position detection unit 450 may employ, for example, a magnetic sensor using Hall elements, MR elements and the like, and may also employ an optical position sensor and the like.

The correction control unit 430 feedback controls the drive amount of the correction lens 410 in response to the position signal of the correction lens 410 obtained from the position detection unit 450. This allows the position of the correction lens 410 to be controlled with a high accuracy even if it is subject to disturbances such as impacts and vibrations.

Note that the correction unit 400 may perform a correction operation anytime, but may also perform a correction operation-only in a period when a user uses the range finder 10. Use of the range finder 10 by a user may be recognized by, for example, detecting the user's eye watching through the eye lens 310, which may turn the correction unit 400 ON/OFF. Also, in response to an operation of the ranging button 900 by a user, the correction unit 400 may start an operation. Subsequently, if a predetermined time is lapsed without user's operation, the correction unit 400 may stop an operation.

The correction lens 410 is driven by the drive unit 420 in the vicinity of the object lens 110 to displace a light path of each of light beams $A_2$, $B_2$. This allows the correction lens 410 to be displaced to negate a displacement of the range finder 10 optically if it is displaced, which can stop a blurring of an image observed by a user. As the correction lens 410 is shared with the light transmission unit 100, the measurement light can continue to irradiate the same target even if the range finder 10 is displaced.

The control unit 600 controls a ranging operation in the range finder 10 in a comprehensive manner. In the present embodiment, the ranging operation includes a series of operations such as outputting the measurement light from the light transmission unit 100, receiving, by the light receiving unit 200, the back reflected light of the measurement light which is, for example, reflected and the like on the target, and computing a distance to the sighting target, and displaying the distance on the display unit. The control targets of the control unit 600 include the light transmission unit 100, the light receiving unit 200, the receiving circuit unit 500, the distance computation unit 800 and the like. The control unit 600 controls these control targets in response to drive of the correction lens 410. For example, the control unit 600 controls at least any of the light transmission unit 100, the light receiving unit 200 and the distance computation unit 800 in response to drive of the correction lens 410 to control a ranging timing. Controlling the timing of ranging includes performing or not performing any operation of the ranging operations described above depending on the timing. For example, at the timing when the drive amount (position) from the optical axis of the correction lens 410 does not fall within the predetermined range, the control unit 600 controls the light transmission unit 100 to stop outputting the measurement light for computing a distance to the sighting target. On the other hand, at the timing when the drive amount (position) from the optical axis of the correction lens 410 falls within the predetermined range, the control unit 600 controls the light transmission unit 100 to output the measurement light for computing a distance to the sighting target. Details are described later.

The distance computation unit 800 reads the light receiving signal stored in the storage unit 700 and computes the distance. The distance computation unit 800 computes the distance to the target based on the timing when the measurement light is output and the timing the light receiving unit 200 receives the incident light.

Specifically, the distance computation unit 800 reads the light receiving signal stored in the storage unit 700. The distance computation unit 800 calculates a timing difference between the timing when the emitting unit 130 outputs the pulse light and the timing when the light receiving element 230 receives the incident light which is reflected and the like on the target, in accordance with a pulse count value of the light receiving signal.

The distance computation unit 800 sequentially performs a calculation process of the timing difference on each pulse light of the measurement light in the same manner. Then, each time the timing difference of the pulse of the light receiving signal is calculated, the signal value is integrated in a memory address which corresponds to the timing difference in the storage unit 700. This generates a histogram for computing the distance. When the process is completed on the light receiving signals which correspond to the pulse lights of the predetermined number, the distance computation unit 800 identifies a memory address of the largest integrated value. The distance computation unit 800 identifies the timing difference $\Delta t$ which corresponds to the memory address as the timing difference of the transmission/receiving light which corresponds to the target.

The distance computation unit 800 computes the distance to the target based on the identified timing difference $\Delta t$. Specifically, the distance computation unit 800 uses the expression below to convert the timing difference into the distance.

$$l = c \times \Delta t / 2$$

where l is the distance to the target and c is the light speed. The distance computation unit 800 transmits to the control unit 600 information of the computed distance l to the target.

The control unit 600 indicates to a user information such as the distance to the target obtained in the distance computation unit 800 by characters, images and the like on the reticle plate 320.

Figure 2:
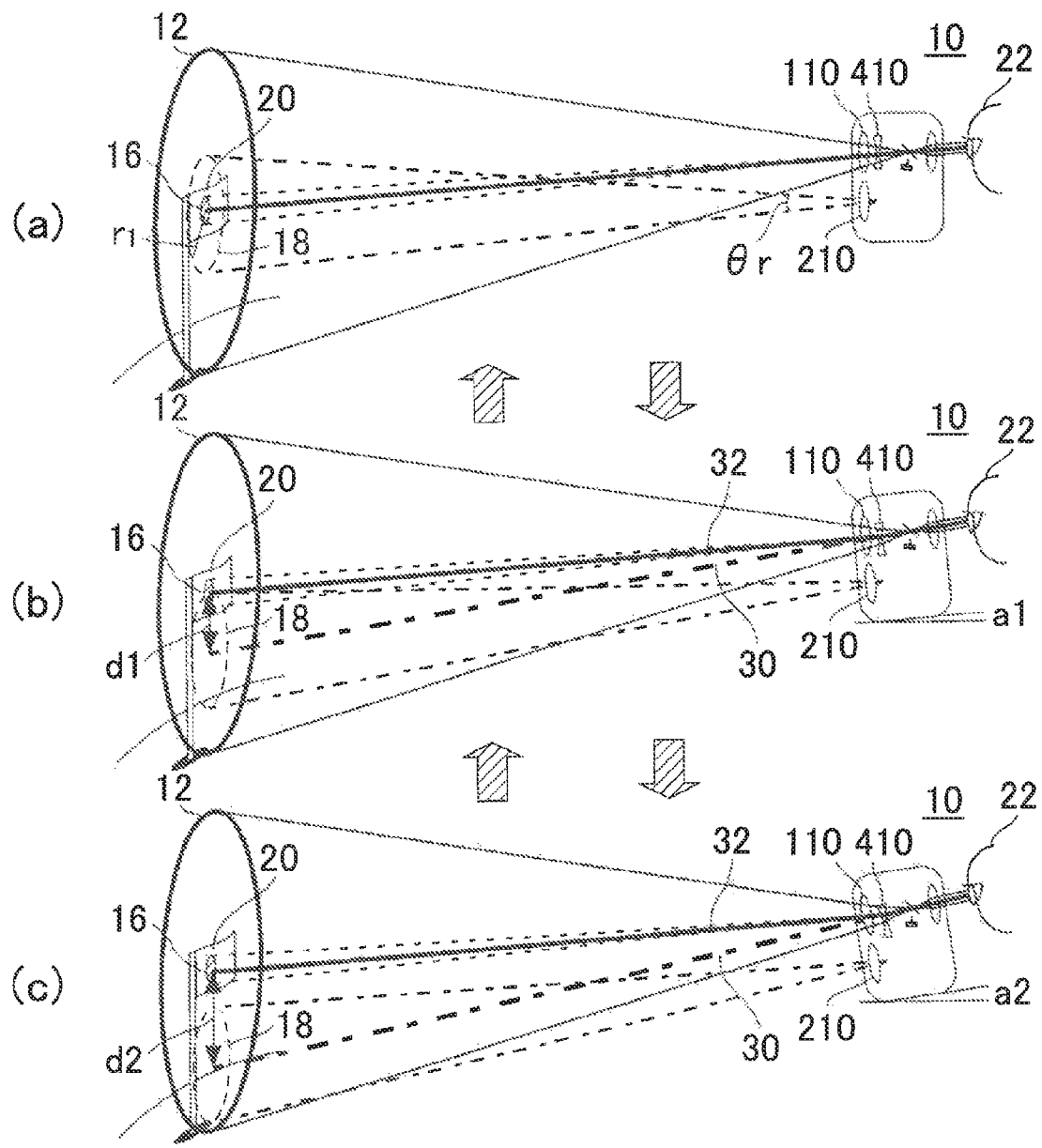
FIG. 2 is a diagram showing one example of a ranging scope of the range finder 10 in the first embodiment.

FIG. 2 shows a situation in which a user 22 ranges a distant target 20 through the range finder 10. An observation region 12 indicates a field of view which the user 22 can observe through the sighting optical system 300.

A sight position in the sighting optical system 300 is positioned on the target 20. As the sighting optical system 300 and the light transmission unit 100 have the same optical axis, the measurement light is irradiated on the sight position. The measurement light output from the object lens 110 spreads at a specific irradiating angle and forms an irradiating light region 16 at the sight position. Within a distance range of measurement defined in the specification, at least a part of the irradiating light region 16 is set to be included in the light receiving region 18.

The light receiving region 18 indicates a region in which the light receiving unit 200 takes in a light. The light receiving region 18 is defined by the distance to the target and a light receiving angle θr. Here, the light receiving angle θr is an angle at which the light is taken in decided by the focal distance of the light receiving lens 210 and an effective light receiving diameter of the light receiving element 230.

FIG. 2(*a*) shows a state in which the hand movement does not occur in the ranging operation. Centers of the observation region 12, the irradiating light region 16, and the light receiving region 18 are on the same position on the target 20.

FIG. 2(*b*) shows a state in which the hand movement in the ranging operation results in a pitching of an angle a1 around the gravity center of the range finder 10. In the range finder 10, the center of the irradiating light region 16 of the measurement light is definitely the same as the center of the observation region 12. Thus, correction of the hand movement by the correction unit 400 allows a pre-correction optical axis 30 to be corrected to a post-correction optical axis 32, which maintains the sight position and the irradiation position of the measurement light on the target 20.

However, the light receiving unit 200 is not provided with the correction unit 400. Thus, the light receiving region 18 is displaced by a distance d1 with respect to the target 20 due to the hand movement.

Here, in the target 20 in FIG. 2(*b*), as a part of the irradiating light region 16 of the measurement light is included in the light receiving region 18, the light receiving unit 200 can detect a part of the measurement light reflected on the target 20.

FIG. 2(*c*) shows a state in which the hand movement in the ranging operation results in a pitching of an angle a2 around the gravity center of the range finder 10, where the angle a2 is larger than the angle a1 described above. The light receiving region 18 is displaced by a distance d2 with respect to the target 20.

In the target 20 in FIG. 2(*c*), the most of or entire irradiating light region 16 of the measurement light is not included in the light receiving region 18. Thus, the light receiving unit 200 cannot detect the measurement light reflected on the target 20.

In the present embodiment, the predetermined range of the drive amount employs, as one example, a variation range of the correction lens 410 which maintains the optical axis of the sighting optical system 300 within the light receiving region 18 decided by the light receiving angle θr. Then, a drive amount of the correction lens 410 which results in a variation of the optical axis corresponding to a radius $r_1$ of the light receiving region 18 is calculated as a threshold dth.

The control unit 600 stores the threshold dth in an internal memory thereof. The control unit 600 determines whether the drive amount of the correction lens 410 falls within the predetermined range, by using the threshold dth.

Figure 3:
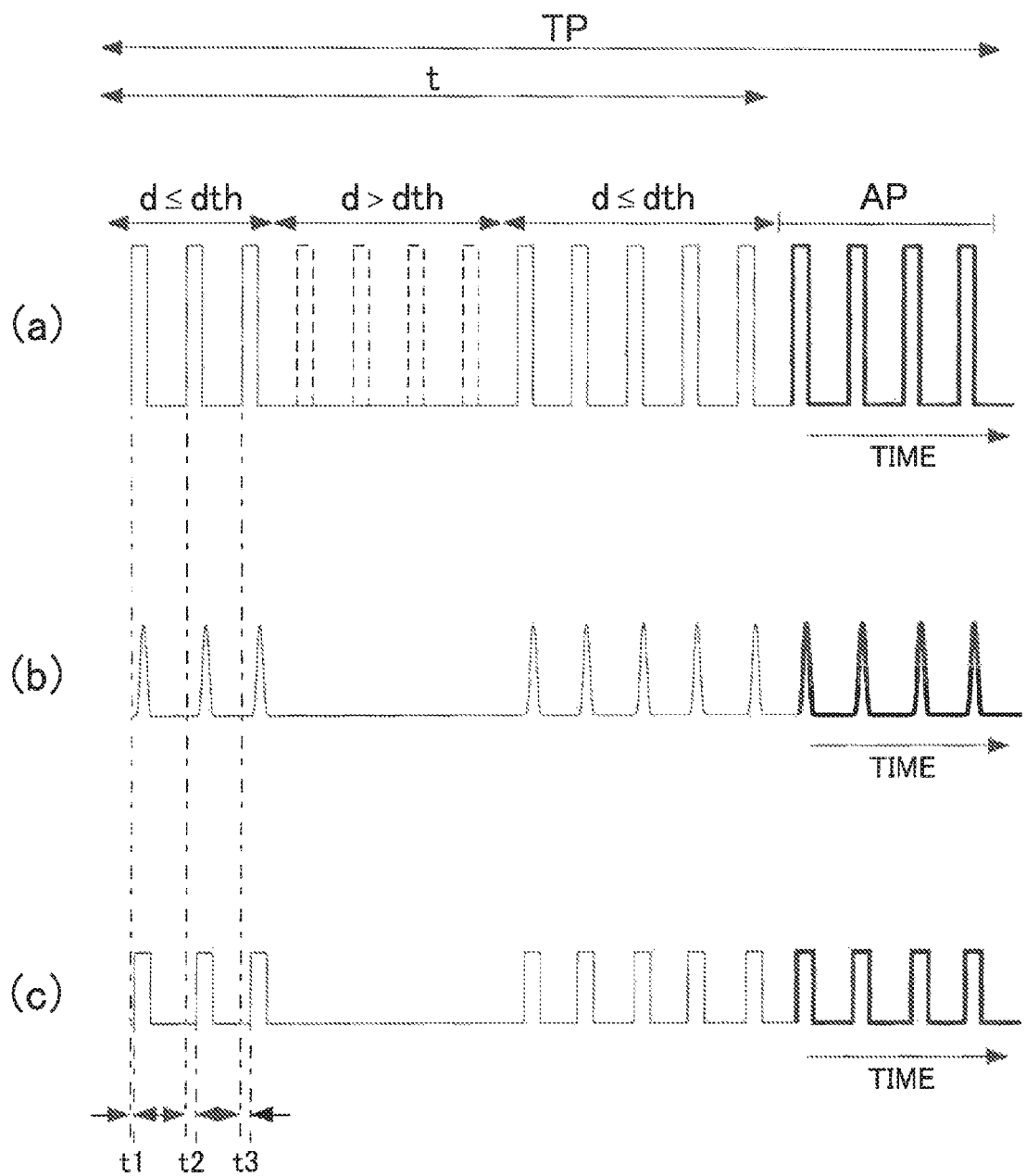
FIG. 3 is a schematic view describing a control operation by the control unit 600 in the first embodiment.
Figure 4:
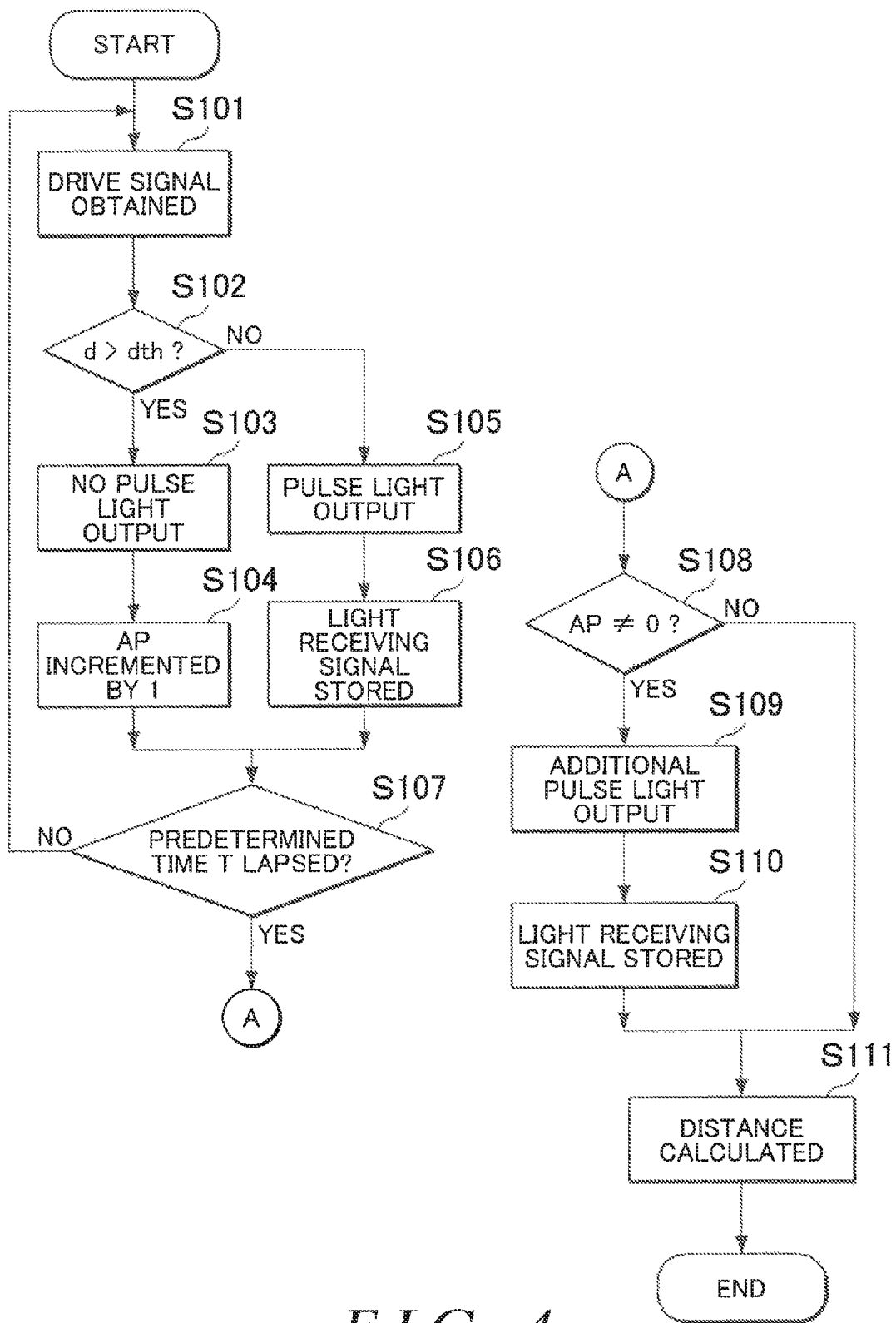
FIG. 4 is a flow diagram describing the control operation by the control unit 600 in the first embodiment.

Next, with reference to FIGS. 3 and 4, one example of the control operation of the control unit 600 is described. FIG. 3 is a schematic view describing the control operation of the control unit 600. FIG. 3(*a*) shows changes in intensity of the measurement light output from the light emitting unit 130 over time. FIG. 3(*b*) shows the electrical signal output from the light receiving element 230. Note that for ease of the description, it is assumed that one electrical signal pulse is output in response to one pulse light of the measurement light. FIG. 3(*c*) shows the light receiving signal stored in the storage unit 700.

In the present embodiment, the control unit 600 stops output of the measurement light if the drive amount d of the correction lens exceeds the predetermined threshold dth. Then, if output of the measurement light is stopped, the control unit 600 stores the number which should have been output in the period when output is stopped, and allows the light emitting unit 130 to output additional pulse lights of the same number.

FIG. 4 is a flow diagram describing the control operation of the control unit 600. With reference to FIG. 4, the specific control operation is described. This control operation starts when the ranging button 900 is pressed down by a user. When the ranging button 900 is pressed down by a user, the control unit 600 causes the light emitting unit 130 to output pulse-like measurement lights of the predetermined number, for example, 320 measurement lights, at the predetermined time interval. The control unit 600 synchronizes a drive pulse with which the correction unit 400 drives the correction lens 410 and a drive pulse with which the measurement light is output from the light transmission unit 100. For example, it is assumed that a control interval for correction of the hand movement and an output interval for the measurement light are 2 kHz.

The control unit 600 obtains the drive signal from the correction control unit 430 (S101). The control unit 600 compares the drive amount d of the correction lens 410 indicated by the drive signal and the threshold dth stored in the internal memory to determine whether the drive amount d exceeds the threshold dth (S102).

If the control unit 600 determines that the drive amount d exceeds the threshold dth (S102: YES), it causes the light transmission unit 100 to stop output of the measurement light (S103). FIG. 3(*a*) shows pulses by dashed lines in the period when output is stopped.

When output of the pulse light is stopped, the control unit 600 increments an AP by one (S103). Here, the AP is a parameter generated in the internal memory of the control unit 600. Note that the AP is initialized by deleting the stored data when this control operation starts.

On the other hand, if the control unit 600 determines that the drive amount d does not exceed the threshold dth (S102: NO), it causes the pulse light to be output (S105). Then, the control unit 600 causes the storage unit 700 to store the light receiving signal (S106).

Next, the control unit 600 determines whether a predetermined time t is lapsed (S107). Here, the predetermined time t is decided by the predetermined output timing interval of the pulse light and the pulse lights of the predetermined number output in one ranging operation. For example, in one ranging operation, given that the predetermined number is 320 and the predetermined time interval is 0.5 ms, the predetermined time is 320×0.5=160 ms. If the predetermined time is determined not to be lapsed (S107: NO), the control unit 600 proceeds to the step S101.

On the other hand, if the predetermined time t is determined to be lapsed (S107: YES), the control unit 600 determines whether the value of the AP is zero (S108). If the value of the AP is determined to be not zero (S108: YES), the control unit 600 causes additional pulse lights of the same number as the value of the AP to be output (S109). Then, the control unit 600 causes the storage unit 700 to store the light receiving signal therein (S110). As shown in FIG. 3(a), the control unit 600 stops output of four pulse lights, and thus causes the light emitting unit 130 to output four pulse lights additionally, after the predetermined time t is lapsed. On the other hand, if the value of the AP is determined to be zero (S108: NO), the control unit 600 does not cause the additional pulse light to be output.

Finally, the distance computation unit 800 computes the distance from the light receiving signal stored in the storage unit 700 (S111). In FIG. 3, timing differences t1, t2, t3 . . . between rising positions of the respective pulse lights in FIG. 3(a) and rising positions of the respective pulse signals FIG. 3(c) correspond to timing differences between output timings of the pulse lights from the light emitting unit 130 and timings of receiving the pulse lights in the light receiving element 230, respectively. If d>dth, the control unit 600 does not cause the pulse light to be output, and thus the electrical signal for calculating the timing difference described above is not detected. Thus, the light receiving signal is not stored in the storage unit 700. Therefore, the distance computation unit 800 computes the distance to the target by using the light receiving signals in the periods except the period when d>dth shown in FIG. 3(c).

The distance computation unit 800 causes the reticle plate 320 via the control unit 600 to display the computed distance to the target. When the step S111 is completed, this control operation is ended.

As described above, according to the embodiments shown in FIG. 1 to FIG. 4, it can be suppressed to range an unintended object, in other words, an object other than the target, thereby ranging the target with a higher accuracy. Further, stopping output of the measurement light if the drive amount does not fall within the predetermined range can save an energy associated with output of the measurement light which does not contribute ranging. On the other hand, outputting additional pulse lights if output of the measurement light is stopped, the total number TP of the measurement lights are maintained, thereby suppressing variations of the measurement result. Also, the drive amount of the correction lens 410 needs not to be limited to the predetermined range described above, but can be set to a larger value, thereby increasing ease of use by a user.

Figure 5:
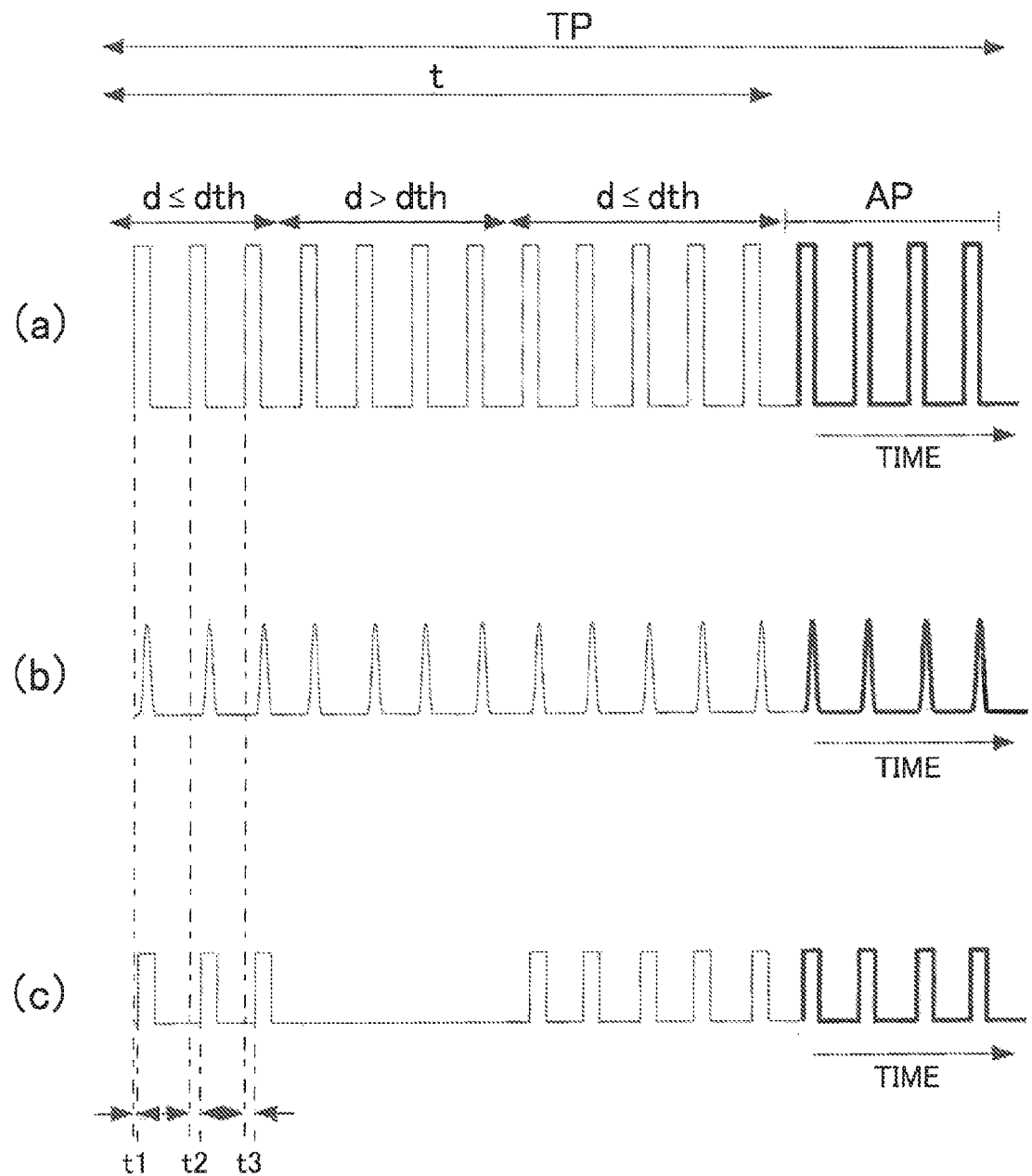
FIG. 5 is a schematic view describing another control operation by the control unit 600.
Figure 7:
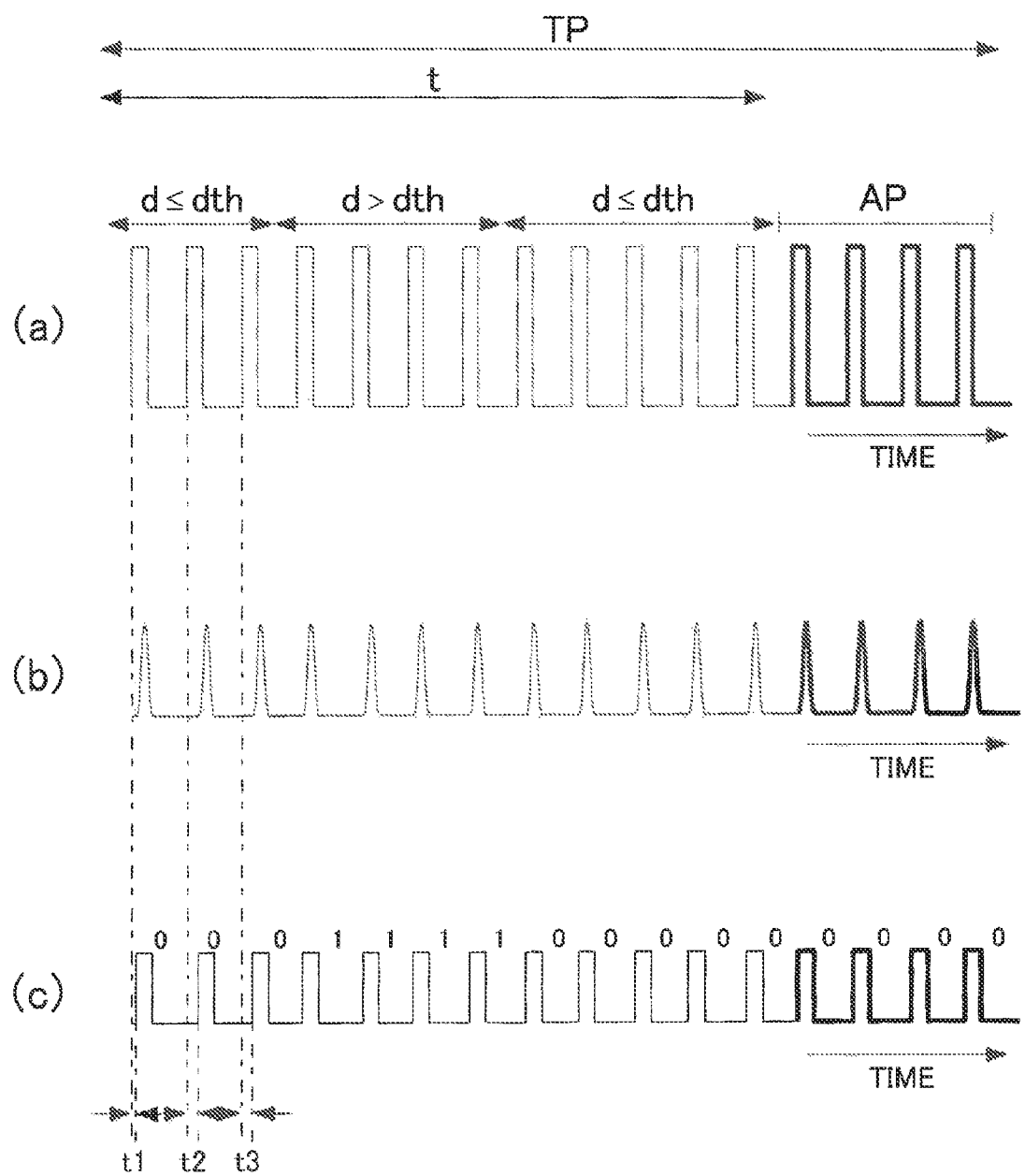
FIG. 7 is a schematic view describing another control operation by the control unit 600.

FIG. 5 and FIG. 7 are schematic views describing another control operation the control unit 600 which is different from the one in FIG. 3. In FIGS. 5 and 7, the control unit 600 does not use the light receiving signal from the light receiving unit 200 if the drive amount does not fall within the predetermined range.

In FIG. 5 and FIG. 7, even in the period when d>dth, the control unit 600 does not stop output of the pulse light. However, the control unit 600 additionally outputs pulse lights of the same number as the number of pulse lights output in the period. Therefore, in FIGS. 5 and 7, the total number TP of pulses of the output measurement light is larger than the one in FIG. 3.

In FIG. 5, the control unit 600 does not store the light receiving signal in the storage unit 700 if the drive amount d does not fall within the predetermined range. On the other hand, it stores the light receiving signal in the storage unit 700 if the drive amount d falls within the predetermined range.

Figure 6:
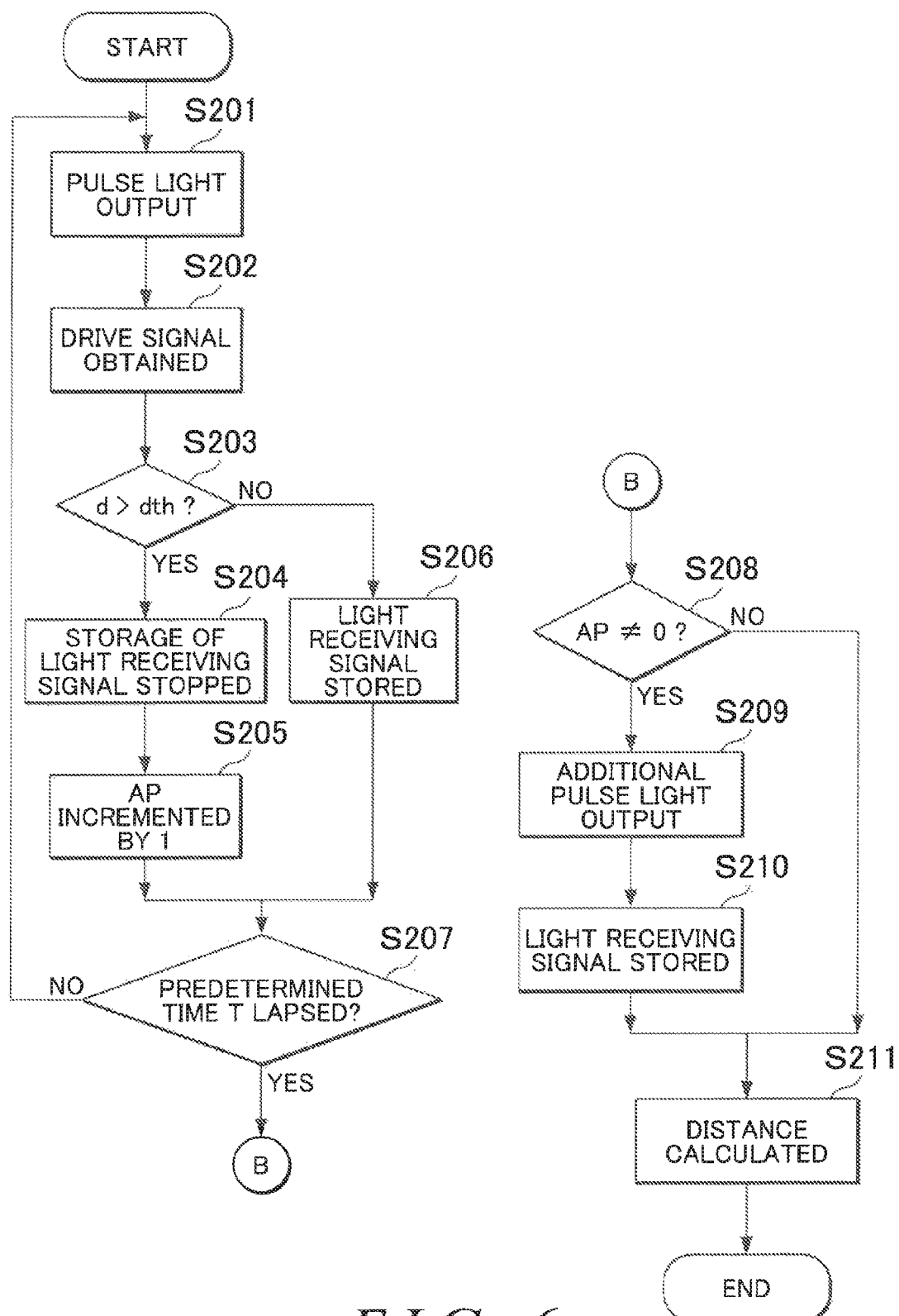
FIG. 6 is a flow diagram describing another control operation by the control unit 600.

FIG. 6 is a flow diagram describing the control operation in FIG. 5. With reference to FIG. 6, the specific control operation is described. Note that the same content as in FIG. 4 is omitted to avoid repeated descriptions. If the control unit 600 determines d>dth (S203: YES), it controls the receiving circuit unit 500 to stop processes on the electrical signal output from the light receiving element 230 and not to store the light receiving signal in the storage unit 700 (S204). This allows the distance computation unit 800 to compute the distance by using the light receiving signals from the storage unit 700, without using the light receiving signal in the period when d>dth.

In FIG. 7, the control unit 600 controls the distance computation unit 800 not to use the light receiving signal if the drive amount d does not fall within the predetermined range. On the other hand, it controls the distance computation unit 800 to compute the distance by using the light receiving signal if the drive amount d falls within the predetermined range.

Figure 8:
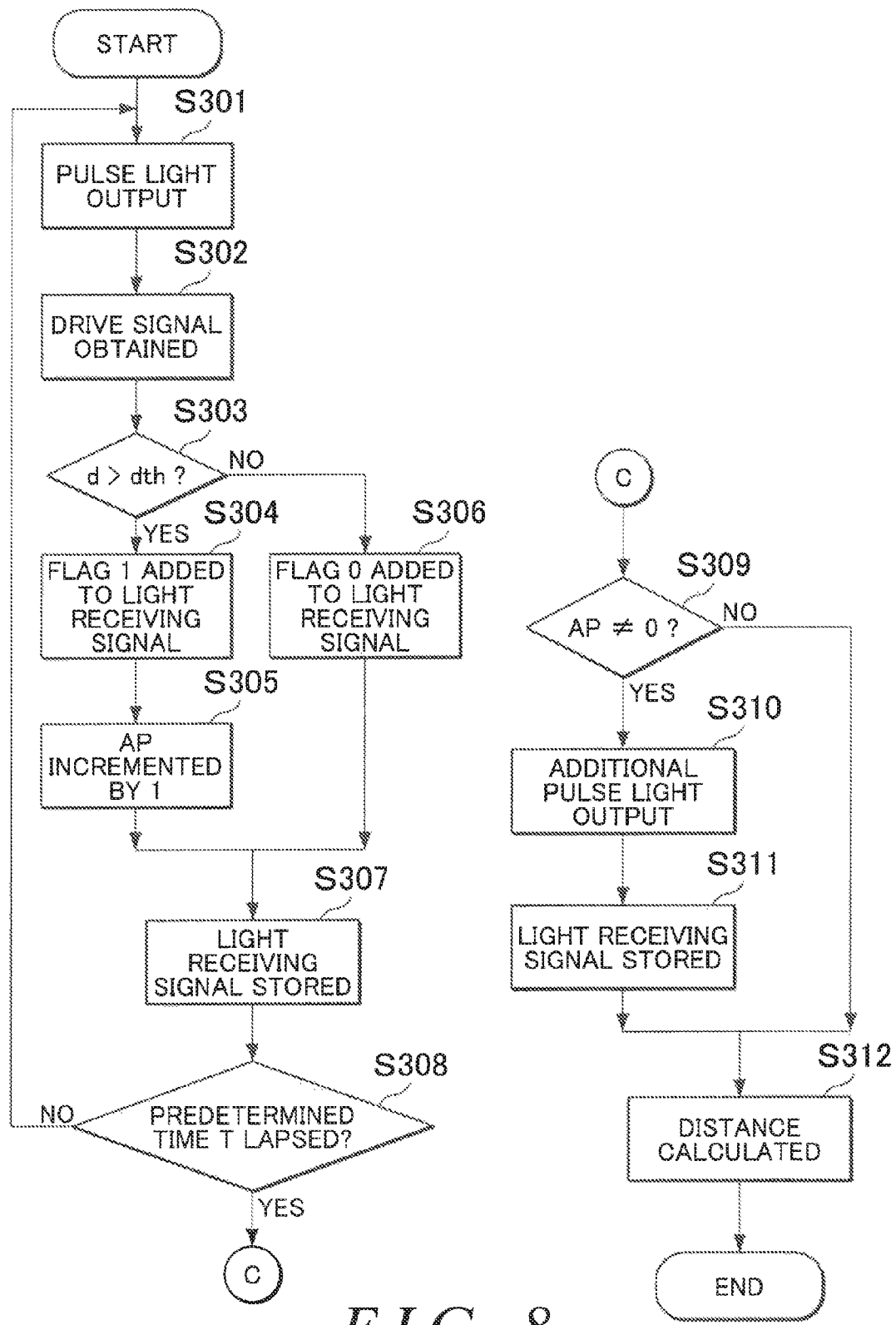
FIG. 8 is a flow diagram describing another control operation by the control unit 600.

FIG. 8 is a flow diagram describing the control operation in FIG. 7. With reference to FIG. 8, the specific control operation is described. Note that the same content as in FIGS. 4 and 6 is omitted to avoid repeated descriptions. The control unit 600 controls the receiving circuit unit 500 in a process on the electrical signals output from the light receiving element 230 to set a flag on the light receiving signal in the period when d>dth different from a flag set on the light receiving signal in the period when d≤dth, and to store it in the storage unit 700. For example, if the control unit 600 determines d>dth (S303: YES), it adds 1 to the light receiving signal as a flag (S304). On the other hand, if the control unit 600 determines d≤dth (S303: NO), it adds 0 to the light receiving signal as a flag (S306). Then, the control unit 600 controls the distance computation unit 800 for computing the distance by using the light receiving signal stored in the storage unit 700 to use the light receiving signal with the flag 0 but not to use the light receiving signal with the flag 1.

As described above, in the embodiments shown in FIG. 5 to FIG. 8, the effects similar to those of the embodiments in FIG. 1 to FIG. 4 can also be obtained.

Note that although the sighting optical system 300 shares a part of optical systems with the light transmission unit 100 in FIG. 1, it may be configured to share a part of optical systems with the light receiving unit 200.

In the embodiments shown in FIG. 1 to FIG. 8, the predetermined range is set based on the light receiving angle of the light receiving unit 200. More specifically, as one example of the predetermined range, the drive amount of the correction lens 410 was set to correspond to a range such that a variation amount of the optical axis of the sighting optical system 300 falls within a radius $r_1$ of the light receiving region 18 determined by the light receiving angle θr. Instead, it may also be set to a range smaller than the radius $r_1$ by a predetermined amount, such as one-half of the radius $r_1$.

Note that in the controls described in FIG. 3 to FIG. 8, additional pulses are output independently of the drive amount of the correction lens 410. Such a control can maintain a ranging accuracy while suppressing considerable extension of time for the ranging operation. However, the similar control may also be performed on the additional pulses in accordance with the drive amount of the correction lens 410. Specifically, in the flow in FIG. 4, if the number AP of additional pulses is determined not to be zero in the step S108 (S108: YES), after decrementing the value of the AP by 1, it proceeds to the step S101 and performs the following steps. Note that in the step S107, it definitely proceeds to the step S108 as the predetermined time t is lapsed (S107: YES). By repeating the process described above until the AP reaches zero in the step S108, the pulse lights of the predetermined number can be output at optimal timings, thereby yielding a ranging result with a higher accuracy. Also, the similar process may also be applied to the flows in FIGS. 6 and 8.

Further, in the step S107 in the flow in FIG. 4, instead of determining whether the predetermined time t is lapsed, whether the pulse lights of the predetermined number are output may also be determined. In such a control, after performing the processes of the step S101 to S107, except the step S104, if the pulse lights of the predetermined number are determined to be output in the step S107, the flow may skip the processes of the step S108 to S110 and proceed to the step S111.

Figure 9:
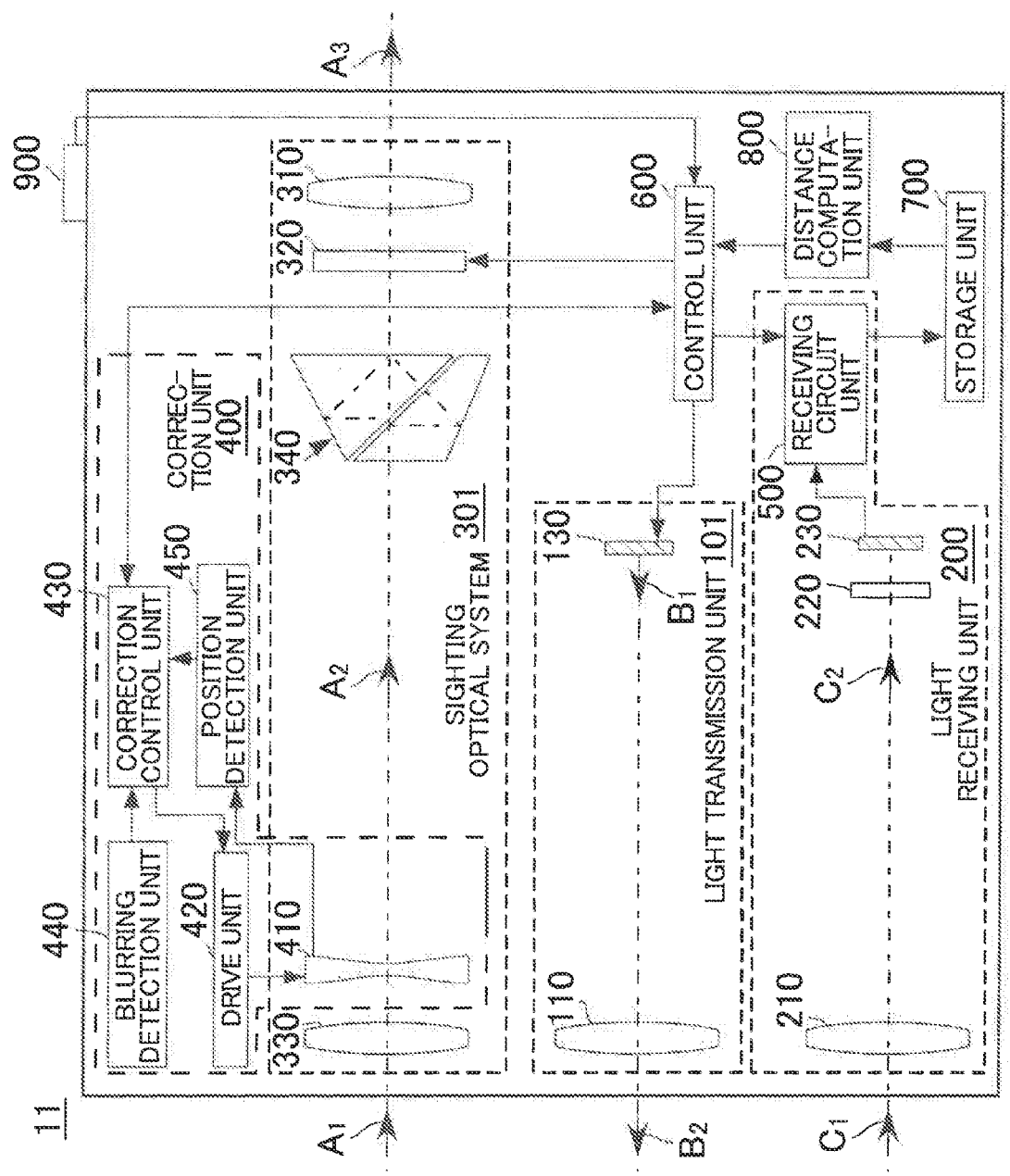
FIG. 9 is a block diagram of a range finder 11 in a second embodiment.

FIG. 9 shows a block diagram of another range finder 11. Note that the same members as those of the range finder 10 hear the same reference signs and the description is omitted. In the following description, a direction in which the light transmission unit 101 of the range finder 11 outputs the measurement light, that is, an arrow direction of a light beam $B_2$ in the figure is referred to as a forward direction.

The light transmission unit 101 includes an object lens 110 and a light emitting unit 130. A sighting optical system 301 includes an object lens 330 and an erect prism 340, in addition to an eye lens 310, a reticle plate 320, and a correction lens 410. Unlike the range finder 10, the sighting optical system 301 in the range finder 11 does not share optical systems with any of the light transmission unit 101 and the light receiving unit 200, and includes an optical axis different from those of the light transmission unit 101 and the light receiving unit 200.

Among light beams which are reflected or scattered on the target positioned anterior to the range finder 11, a light beam $A_1$ propagated within a range of a visual angle of the object lens 330 enters the range finder 11 through the object lens 330. The light beam $A_1$ is transmitted through the correction lens 410 and propagated backward inside the range finder 11, as a light beam $A_2$, and output through the erect prism 340, the reticle plate 320 and the eye lens 310 to the back side of the range finder 11, as a light beam $A_3$. This all user to observe the erect image of the target through the eye lens 310.

A user instructs the range finder 11 to start a ranging operation by, for example, a switch operation of the ranging button 900 provided in the range finder 11. If a user instructs the range finder 11 to perform ranging, the light emitting unit 130 outputs the pulse-like measurement light forward to the object lens 110, as a light beam $B_1$. The measurement light is collimated through the object lens 110 and output toward the front side of the range finder 11 to the outside, as the light beam $B_2$. The measurement light output as the light bean $B_2$ is irradiated on a ranging target.

The measurement light reflected or scattered on the target positioned anterior to the range finder 11 enters the light receiving lens 210 as a light beam $C_1$. The light beam $C_1$ is propagated backward inside the range finder 11, as a light beam $C_2$, and received in the light receiving element 230 after passing through the band transmission filter 220.

Figure 10:
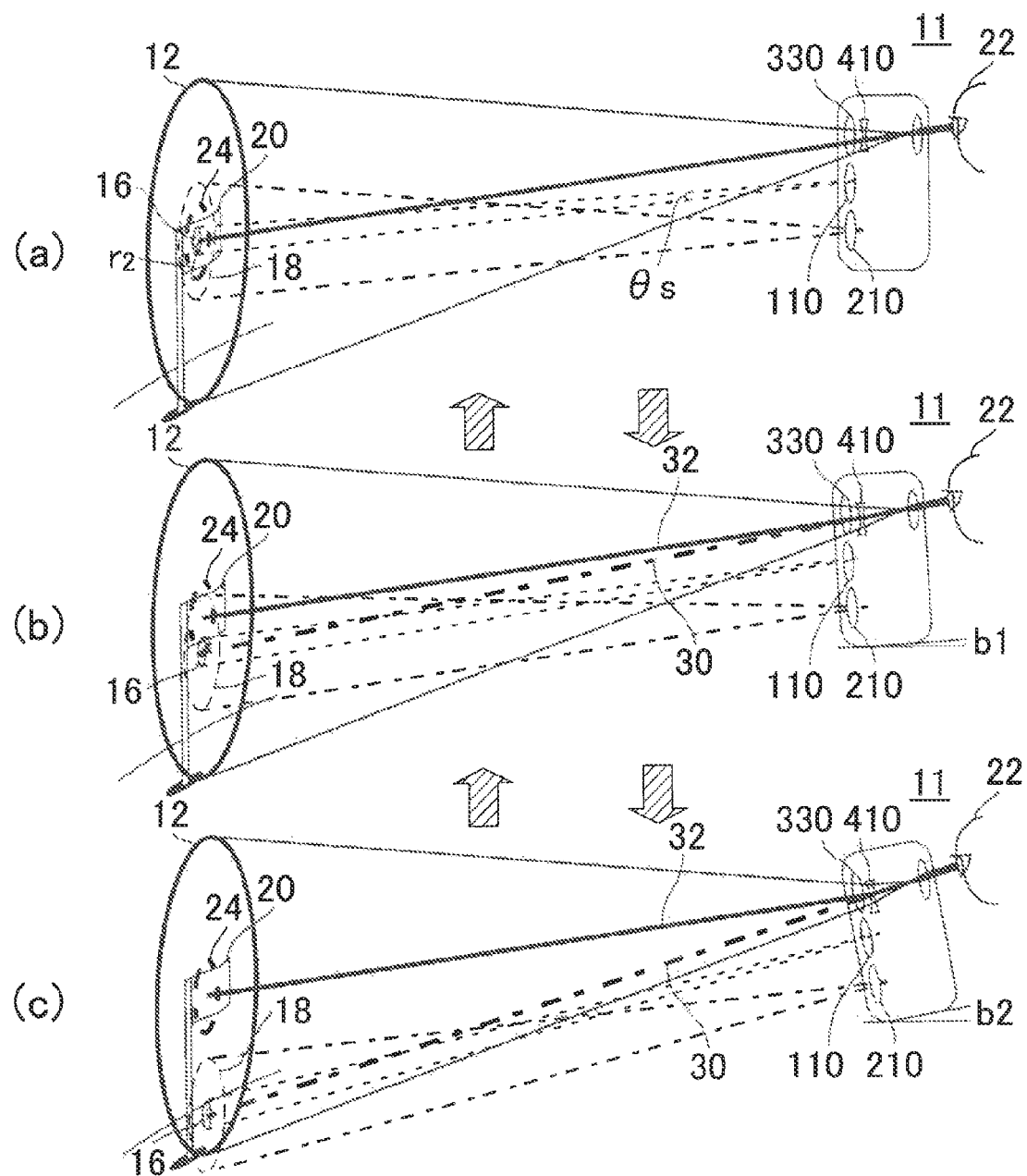
FIG. 10 is a diagram showing one example of a ranging scope of the range finder 11 in the second embodiment.

FIG. 10 shows a situation in which a user 22 ranges a distant target 20 through the range finder 11 in the same manner as FIG. 2. FIG. 10(a) shows a state in which the hand movement does not occur in the ranging operation. In this case, centers of the observation region 12, the irradiating light region 16, and the light receiving region 18 are on the same position on the target 20.

FIG. 10(b) shows a state in which the hand movement in the ranging operation results in a pitching of an angle b1 around the gravity center of the range finder 11. Correction of the hand movement by the correction unit 400 allows the observation region 12 to be fixed with respect to the target 20, which maintains the sight position on the target 20.

However, the light transmission unit 101 and the light receiving unit 200 are not provided with the correction unit 400. Thus, the irradiating light region 16 and the light receiving region 18 are displaced with respect to the target 20 due to the hand movement. Therefore, a ranging region 24 is set in advance. As shown in FIG. 10(b), if the center of the irradiating light region 16 included in the ranging region 24 around the center of the observation region 12 which is a sight position of a user, the measurement light is output.

FIG. 10(c) shows a state in which the hand movement in the ranging operation results in a pitching of an angle b2 around the gravity center of the range finder 11, where the angle ab is larger than the angle b1 described above. In the state shown in FIG. 10(c), the center of the irradiating light region 16 is deviated from the ranging region described above 24. In this case, the range finder 11 stops output of the measurement light.

The ranging region described above 24 is set in advance based on the irradiating angle. That is, the predetermined range of the drive amount is set in advance based on the irradiating angle. In the present embodiment, the predetermined range of the drive amount employs, as one example, a variation range of the correction lens 410 which maintains the center of the irradiating light region 16 within the ranging region 24. The control unit 600 computes the drive amount of the correction lens 410 which generates a variation of the optical axis of the sighting optical system 300 corresponding to a radius $r_2$ of the ranging region 24 from the center of the irradiating light region 16 as the threshold dth and stores it in the internal memory thereof. The control unit 600 determines whether the drive amount of the correction lens 410 falls within the predetermined range, by using the threshold dth.

As described above, in the embodiments shown in FIG. 9 and FIG. 10, the effects similar to those of the embodiments in FIG. 1 to FIG. 4 can also be obtained. Note that if the drive amount of the correction lens 410 does not fall within the predetermined range, the control operations described in FIGS. 5 to 8 may also be applied, instead of stopping output of the measurement light.

Note that in FIG. 1 and FIG. 9 illustrated above, the object lenses 110, 330, the light receiving lens 210 and the eye lens 310 are illustrated by one representative lens. However, these lenses may also include a plurality of lenses.

Further, the object lenses 110, 330, the light receiving lens 210 and the eye lens 310 may have variable focal distances, respectively. In this case, varying the focal distance of the light receiving lens 210 results in changes in the light receiving angle. Therefore, in the range finders 11, the predetermined range of the drive amount of the correction lens 410 may be set in accordance with changes in the focal distance of the light receiving lens 210.

The light emitting unit 130 may also emit an ultraviolet light instead of emitting an infrared light. In this case, in the erect prism 120 in the first embodiment, the dichroic reflection surface 122 which corresponds to an ultraviolet light is used.

As described above, in order to correct a blurring of the optical axis in the sighting optical systems 300, 301, the correction lens 410 is used as an optical member. However, the erect prism 120 and the erect prism 340 may also be used instead of the correction lens 410. Also, as another correction member, a prism with a variable apex angle and the like may also be used which can vary an apex angle formed between an incident surface and an output surface by swaying a member forming the incident surface or the output surface.

The control unit 600 may control a drive pulse with which the correction unit 400 drives the correction lens 410 and a drive pulse with which the measurement light is output from the light transmission unit 100 in an asynchronous manner. In an asynchronous control, the position detection unit 450 periodically outputs to the correction control unit 430 position signals which indicate the position of the correction lens 410. When the correction lens 410 is determined to be positioned within the predetermined range based on the position signals, the correction control unit 430 outputs an Hi signal, for example, to an I/O line of the control unit 600. When the Hi signal is input, the control unit 600 may cause the measurement lights to be output at a predetermined time interval. Also, depending on whether the drive amount of the correction lens 410 periodically computed by the correction control unit 430 falls within the predetermined range, an asynchronous control may also be performed in the similar manner.

In the examples shown in FIG. 1 to FIG. 10, the distance computation unit 800 calculates the distance by using the light receiving signals which correspond to the pulse lights of the predetermined number, but the method of computing the distance is not limited thereto. For example, given that the pulse lights output when the drive amount d of the correction lens 410 is outside the predetermined range are removed from the pulse lights of the predetermined number, the distance computation unit 800 may also compute the distance by using the light receiving signals which correspond to the number of residual pulse lights. In this case, it is not necessary to output the additional pulse light AP described above. Also, given that the pulse lights output when the drive amount d of the correction lens 410 is outside the predetermined range are removed from the pulse lights of the predetermined number, if the number of residual pulse lights is larger than a predetermined threshold, the distance may be computed based on the number of residual pulse lights, or if it is equal to or smaller than the threshold, the additional pulse light AP may be output. Instead or in addition, it may also be alerted to a user by a display on the reticle plate 320 and the like that the number is small.

In the examples shown in FIG. 1 to FIG. 10, the control unit 600 controls a ranging timing based on the drive omit computed by the correction control unit 430. However, it may also control a ranging timing based on the movement amount of the optical axis or the position of the correction lens 410 detected by the position detection unit 450.

In the examples shown in FIG. 1 to FIG. 10, the example was described in which one light receiving signal is detected for one pulse light of the measurement light. Without being limited thereto, even if a plurality of light receiving signals are detected for one pulse light of the measurement light, the processes may be applied in a similar manner. Also, in the examples shown in FIG. 1 to FIG. 10, the example was described in which the distance is computed by using the histogram to which signal values of the timing differences are integrated. Without being limited thereto, the processes may be applied in a similar manner to cases in which a histogram is not used, for example, computing the distance from an average value of the signal values of the timing differences.

Further, the range finders 10, 11 are provided with an adjustment mode to adjust the predetermined range of the drive amount. For example, in the adjustment mode, the correction lens 410 is first displaced at a constant width, and the range is then examined within which the measurement light can be received. Then, the displacement range of the correction lens 410 within which the light can be received is set as the predetermined range. The control unit 600 calculates the threshold dth to determine whether the drive amount of the correction lens 410 falls within the predetermined range and stores it in the internal memory thereof. Note that adjustment of the range in the adjustment mode may be performed during assembly adjustment, or may also be performed by a user per se in use of the range finder 10.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A distance detection apparatus comprising:
   a light output unit which outputs a light;
   a computation unit which computes a distance to a detection target by using a time until when the light output from the light output unit is received in a light receiving unit;
   a deblurring optical system which is driven based on a detection result of a blurring and through which the output light is transmitted;
   a detection unit which detects a position of the deblurring optical system;
   a storage unit which stores a predetermined range;
   a determination unit which determines whether the position detected by the detection unit is included in the predetermined range; and
   a control unit which controls a light output by the light output unit in accordance with a determination result of the determination unit.

2. The distance detection apparatus according to claim 1, wherein the control unit controls the light output unit to output the light when the position detected by the detection unit is included in the predetermined range, and controls the light output unit not to output the light when the position detected by the detection unit is outside of the predetermined range.

3. The distance detection apparatus according to claim 1, wherein the light receiving unit is allowed to receive the output light when the position of the deblurring optical system is included in the predetermined range and is not allowed to receive the output light when the position of the deblurring optical system is outside of the predetermined range.

4. A distance detection apparatus comprising:
a light output unit which outputs a light;
a computation unit which computes a distance to a detection target by using a time until when the light output from the light output unit is received in a light receiving unit;
a deblurring optical system which is driven based on a detection result of a blurring and through which the output light is transmitted;
a detection unit which detects a drive amount of the deblurring optical system;
a storage unit which stores a predetermined range;
a determination unit which determines whether the drive amount detected by the detection unit is included in the predetermined range; and
a control unit which controls a light output by the light output unit in accordance with a determination result of the determination unit.

5. A distance detection apparatus comprising:
a computation unit which computes a distance to a detection target by using a time until when an output light is received in a light receiving unit;
a deblurring optical system which is driven based on a detection result of a blurring and through which the output light is transmitted;
a detection unit which detects at least one of a drive amount of the deblurring optical system and a position of the deblurring optical system;
a storage unit which stores a predetermined range; and
a determination unit which determines whether at least one of the drive amount and the position detected by the detection unit is included in the predetermined range; wherein
the distance detection apparatus controls the computation unit in accordance with a determination result of the determination unit.

6. The distance detection apparatus according to claim 5, controlling the computation unit to compute a distance to a detection target by using a time until when the output light is received in a light receiving unit when at least one of the drive amount and the position detected by the detection unit is included in the predetermined range, and not to compute the distance to the detection target when at least one of the drive amount and the position is not included in the predetermined range.

7. A distance detection apparatus comprising:
a light receiving unit which receives an output light;
a computation unit which computes a distance to a detection target by using a time until when the output light is received in the light receiving unit;
a deblurring optical system which is driven based on a detection result of a blurring and through which the output light is transmitted;
a detection unit which detects at least one of a drive amount the deblurring optical system and a position of the deblurring optical system;
a storage unit which stores a predetermined range; and
a determination unit which determines whether at least one of the drive amount and the position detected by the detection unit is included in the predetermined range; wherein
the distance detection apparatus controls the light receiving unit in accordance with a determination result of the determination unit.

8. The distance detection apparatus according to claim 7, controlling the light receiving unit to receive the output light when at least one of the drive amount and the position detected by the detection unit is included in the predetermined range, and controlling the light receiving unit not to receive the light output from a light output unit when at least one of the drive amount and the position is not included in the predetermined range.

9. An optical device comprising the distance detection apparatus according to claim 1.

10. An optical device comprising the distance detection apparatus according to claim 2.

11. An optical device comprising the distance detection apparatus according to claim 3.

12. An optical device comprising the distance detection apparatus according to claim 4.

13. An optical device comprising the distance detection apparatus according to claim 5.

14. An optical device comprising the distance detection apparatus according to claim 6.

15. An optical device comprising the distance detection apparatus according to claim 7.

16. An optical device comprising the distance detection apparatus according to claim 8.

* * * * *